A. ENSOR.
FEEDING DEVICE.
APPLICATION FILED FEB. 16, 1914.
1,136,322.
Patented Apr. 20, 1915.
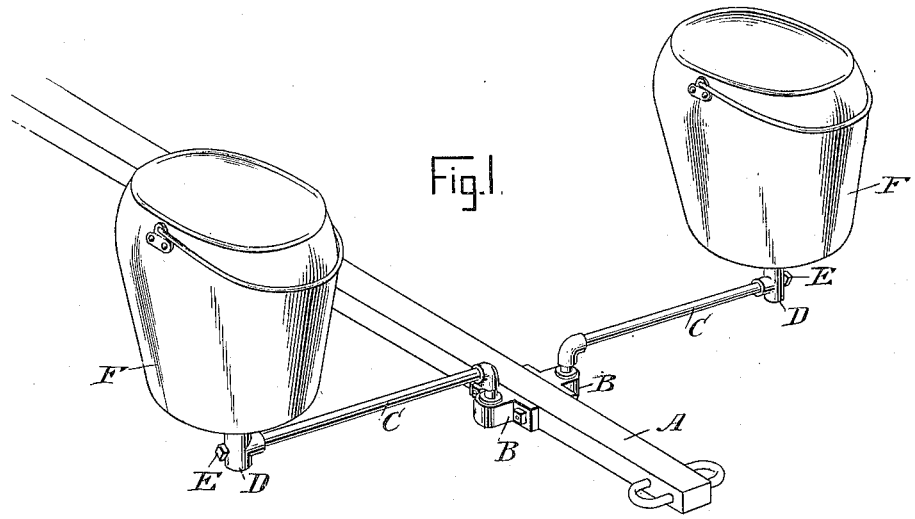
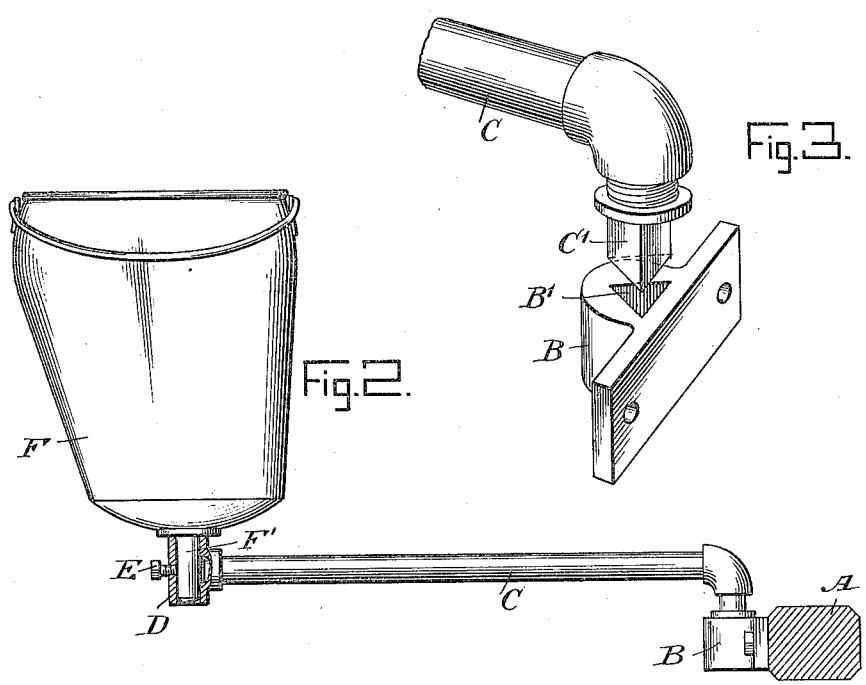
WITNESSES
INVENTOR
Albert Ensor
BY
ATTORNEYS

UNITED STATES PATENT OFFICE.

ALBERT ENSOR, OF JERSEY CITY, NEW JERSEY.

FEEDING DEVICE.

1,136,322. Specification of Letters Patent. Patented Apr. 20, 1915.

Application filed February 16, 1914. Serial No. 818,904.

*To all whom it may concern:*

Be it known that I, ALBERT ENSOR, a citizen of the United States, and a resident of Jersey City, in the county of Hudson and State of New Jersey, have invented a new and Improved Feeding Device, of which the following is a full, clear, and exact description.

The object of the invention is to provide a new and improved feeding device for attachment to a shaft or pole of a vehicle and adapted to contain oats or other feed for feeding the draft animals harnessed to the vehicle, the device being arranged to permit of conveniently and quickly placing it in position on the shaft or pole or removing it therefrom after feeding the draft animals and conveniently storing it in the vehicle.

In order to accomplish the desired result use is made of brackets permanently attached to a shaft or pole of a vehicle, a supporting device removably engaging the said brackets and a feed receptacle removably held on the said supporting device.

A practical embodiment of the invention is represented in the accompanying drawings forming a part of this specification, in which similar characters of reference indicate corresponding parts in all the views.

Figure 1 is a perspective view of the feeding device as applied to a vehicle pole for feeding draft animals hitched to the vehicle; Fig. 2 is a front elevation of the same with parts of the device and the vehicle pole in section; Fig. 3 is an enlarged perspective view of one of the pole brackets and a portion of the supporting bar in detached position.

The feeding device, as illustrated in Figs. 1, 2 and 3, is shown applied to the forward end of the vehicle pole A, and for this purpose brackets B are secured to opposite sides of the pole A in alinement with each other and near the front end thereof. Each of the brackets B is provided with a polygonal vertically-disposed opening or socket B′ into which fits a correspondingly disposed stud C′ extending downward from the inner end of a supporting bar C into which said stud screws adjustably, and which is provided at its outer end with a socket D in which is adjustably secured by the use of a set screw E a stud F′ depending centrally from the bottom of a feed receptacle F of sheet metal or other suitable rigid material. It will be noticed that the bars C, C extend from the two brackets B approximately at right angles to the pole A so as to support the feed receptacles F in position for the draft animals to eat the oats or other feed contained in the receptacles F. It will also be noticed that by making the stud C′ and the openings B′ polygonal the bars C are held against turning and at the same time the bars C can be readily disengaged from the brackets B, which latter are permanently fastened in position on the pole A. It will further be noticed that on loosening the set screws E the receptacles F can be readily placed in position on the sockets D and turned into proper position so that the animals' heads can readily enter the open tops of the receptacles F and that the receptacles can be vertically adjusted. It is understood that when the receptacles F have been adjusted to the desired position the set screws E are screwed up to securely fasten the receptacles F in place. After the animals are fed the set screws E are loosened and the receptacles F are removed from the bars C, and the latter are disconnected from the brackets B to allow of conveniently storing the receptacles F and bars C in the vehicle.

Having thus described my invention, I claim as new and desire to secure by Letters Patent:—

1. A feeding device for use on vehicles comprising brackets attached to the sides of the pole of a vehicle in alinement with each other, each bracket having a vertically disposed socket polygonal in cross section, a supporting bar provided at one end with a threaded socket, a polygonal pin threaded at one end and adjustably engaging the threaded socket, said polygonal pins adapted to fit in the brackets, a bearing at the outer end of the said bar, and a feed receptacle provided at its bottom with a shank adjustably engaging said bearing.

2. A feeding device for use on a vehicle comprising brackets attached to the sides of the pole of a vehicle in alinement with each other, each bracket having a vertically disposed socket polygonal in cross section, a supporting bar provided at one end with an internally threaded elbow, a pin threaded at its upper end into said elbow and polygonal at its lower end, a T head bearing at the outer end of the said bar, a feed receptacle provided at its bottom with a shank adjustably engaging the said bearing, and a set screw on the bearing for removably and adjustably holding the shank in place.

In testimony whereof I have signed my name to this specification in the presence of two subscribing witnesses.

ALBERT ENSOR.

Witnesses:
A. L. KITCHIN,
PHILIP D. ROLLHAUS.